United States Patent [19]
Kawahara

[11] Patent Number: 4,896,321
[45] Date of Patent: Jan. 23, 1990

[54] SELF-MONITORING SYSTEM

[75] Inventor: Masafumi Kawahara, Nara, Japan

[73] Assignee: Sharp Kabushiki Kaisha, Osaka, Japan

[21] Appl. No.: 148,964

[22] Filed: Jan. 27, 1988

[30] Foreign Application Priority Data

Jan. 28, 1987 [JP] Japan .................................. 62-11681

[51] Int. Cl.$^4$ ............................................. G06F 11/00
[52] U.S. Cl. .................................... 371/16.1; 371/16.3
[58] Field of Search ............................. 371/12, 62, 16; 364/200, 900

[56] References Cited

U.S. PATENT DOCUMENTS

| 4,566,111 | 1/1986 | Tanagawa | 371/62 |
| 4,586,180 | 4/1986 | Anders | 371/12 |
| 4,594,685 | 6/1986 | Owens | 371/16 |
| 4,618,953 | 10/1986 | Daniels et al. | 371/12 |
| 4,627,060 | 12/1986 | Huang | 371/12 |
| 4,752,930 | 6/1988 | Kitamura | 371/62 |
| 4,763,296 | 8/1988 | Gercekci | 371/62 |
| 4,766,596 | 8/1988 | Michels-Krohn | 371/62 |
| 4,796,211 | 1/1989 | Yokouchi | 371/62 |

Primary Examiner—Michael R. Fleming
Attorney, Agent, or Firm—Flehr, Hohbach, Test, Albritton & Herbert

[57] ABSTRACT

A self-monitoring system is comprised of a main processing unit incorporating a computer and an interrupt processing unit which regularly interrupts the operation of program by the main processing unit. Each unit contains a counter which counts the processing time of the associated unit and is initialized by the other unit. The two units thereby check the operation of each other by monitoring the numbers counted by these counters.

5 Claims, 2 Drawing Sheets

SELF-MONITORING SYSTEM

BACKGROUND OF THE INVENTION

This invention relates to a system provided with a main processing part and an interrupt processing part, and more particularly to a self-monitoring system of this type which is so structured that each of these two parts monitors the operations of the other.

Many systems incorporating a computer (and more particularly a micro-computer) are comprised of a central processing unit CPU and peripheral devices which are disposed around this CPU and perform various operations by transmitting signals to the CPU and/or receiving signals from the CPU. The CPU may also contain within itself a device which is independent of the programs stored in the computer and performs operations on such programs.

If such a device which is either external to the computer or forms its internal part issues a command during the course of an operation of the system to temporarily stop the execution of the internal program of the computer and to execute a different independent program, such a routine is referred to as an interrupt, and the program which is executed by an interrupt is referred to as an interrupt processing program. The program which was interrupted may be referred to as the main program. When the execution of an interrupt processing program is completed, the execution of the main program is resumed from the address where its execution was earlier interrupted.

With fluid injection pumps and the like provided with a main processing part which executes a main program and an interrupt processing part which executes an interrupt processing program, the main and interrupt processing parts normally operate independently of each other without affecting each other except when data are exchanged between them. For this reason, if either of them stops functioning completely or begins to operate erratically due to a system abnormality, such an abnormal situation may not be detectable, if observed from outside the system. Let us consider a situation, for example, where it has become impossible for an interrupt to occur at all. In this case, the system will continue to operate only with the main processing part but since the system operation is continuing with the main processing part, it may appear as if the system were operating normally, that is, the abnormality which has occurred and is preventing the interrupt from functioning is not reported by the system. For example, the system may have developed a runaway situation. Such a situation must be prevented, especially in the case of a medical system but it may take a long time before its occurrence is detected.

SUMMARY OF THE INVENTION

It is therefore an object of the present invention to provide a self-monitoring system capable of dependably detecting the occurrence of such an abnormal condition through self-monitoring.

A self-monitoring system incorporating a computer which achieves the above and other objects is comprised of a main processing unit which operates according to a system clock of the computer and an operating sequence of its program and an interrupt processing unit which operates by an internal interrupt or an interrupt signal received from outside such that the main processing unit checks whether the interrupt processing unit is operating according to its intended timing schedule and the interrupt processing unit checks whether the main processing unit is operating according to its own intended timing schedule.

For this purpose, counters are provided both to the main and interrupt processing units such that their contents will increase or decrease corresponding to their individual timing schedules of processing. Each unit has means to reset the counter for the other such that an abnormal condition can be detected by monitoring the contents of these counters.

BRIEF DESCRIPTION OF THE DRAWINGS

The accompanying drawings, which are incorporated in and form a part of the specification, illustrate an embodiment of the present invention and, together with the description, self-explain the principles of the invention. In the drawings.

DETAILED DESCRIPTION OF THE INVENTION

Figure 1:
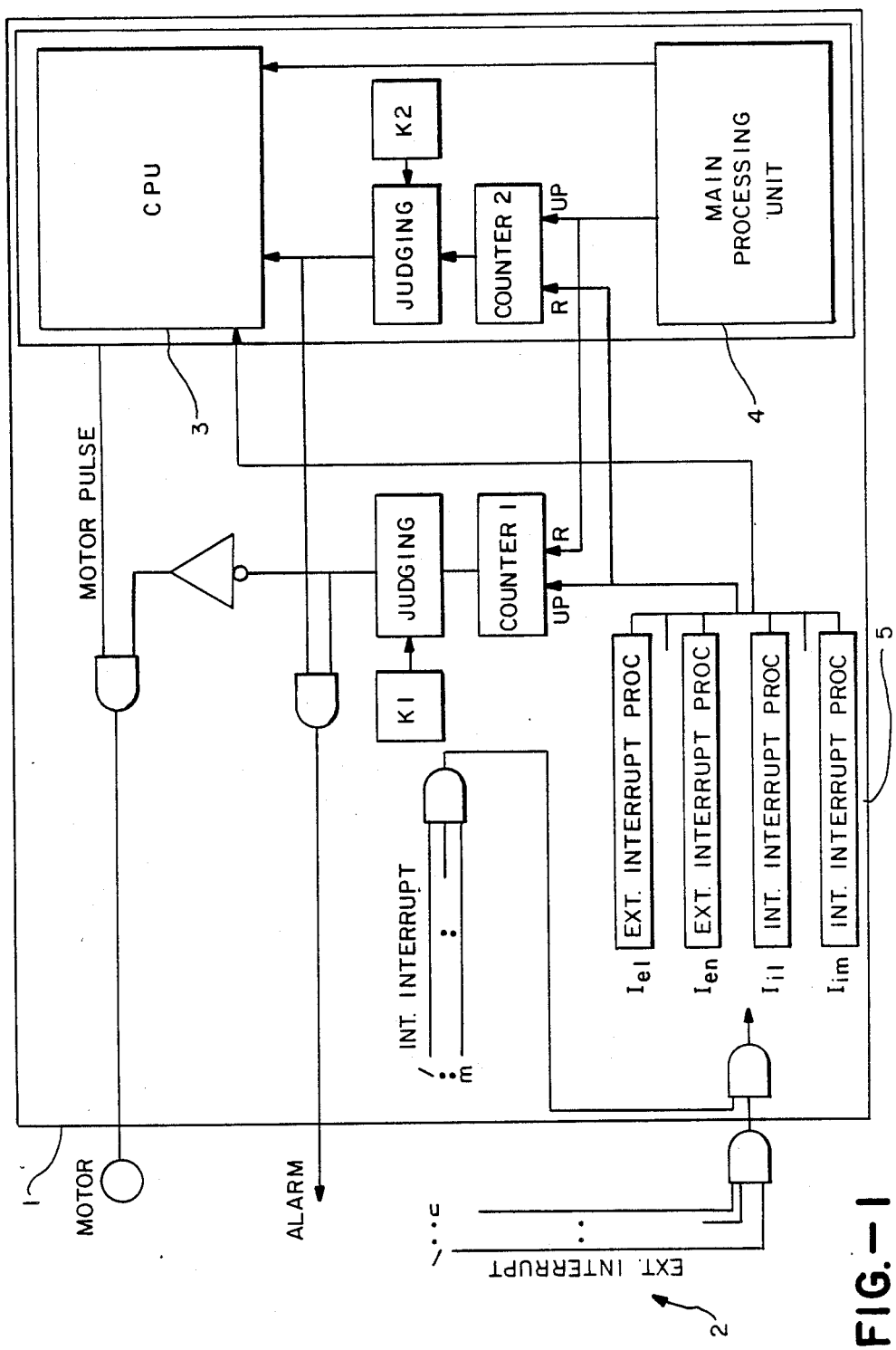
FIG. 1 is a block diagram of a self-monitoring system embodying the present invention.

In FIG. 1 which shows the basic structure of a system embodying the present invention for controlling the operation of a motor, numeral 1 indicates a computer which is incorporated in the system and numeral 2 schematically indicates external devices connected to this computer 1. The computer 1 includes a central processing unit CPU 3, a main processing unit MPU 4 and a plurality of interrupt processing units 5. The interrupt processing units 5 include external interrupt processing units, $I_{e1} \ldots I_{en}$ activated by external interrupt signals 1 ... n, respectively, from the external devices 2 and internal interrupt processing units $I_{i1} \ldots I_{im}$, activated by internal interrupt signals 1, ... m, respectively, which are outputted internally.

In order to monitor the condition of the system operation, counters are provided respectively to the main processing unit 4 and the interrupt processing units 5. According to a preferred embodiment of the present invention, each of the external and internal interrupt processing units $I_{e1}, \ldots I_{en}, I_{i1}, \ldots I_{im}$ is provided with a separate counter and the same total number (m+n) of counters corresponding to these are provided to the main processing unit 4. For the sake of simplicity in the drawing, however, FIG. 1 shows only one counter (referred to as the first counter, or "Counter 1" in the drawings) provided to the interrupt processing units 5 and another single counter (referred to as the second counter, or "Counter 2" in the drawings) provided to the main processing unit 4. As will become clearer below, if only one counter each is provided to the interrupt processing units 5 and the main processing unit 4, respectively, the occurrence of an abnormal situation can still be detected but it cannot be ascertained which of the internal or external interrupt signals is reporting the abnormal situation.

As schematically shown by arrows in FIG. 1, the main processing unit 4 has the functions of inputting "0" to (resetting) the first counter and adding 1 to the content of the second counter (R and UP) and the interrupt processing units 5 have the functions of inputting "0" to (resetting) the second counter and adding 1 to the content of the first counter (R and UP). The contents of the counters are respectively adapted to be compared with predefined constant values, $X_1$ and $X_2$ for determining whether an abnormal condition has occurred.

Figures 2, 3:
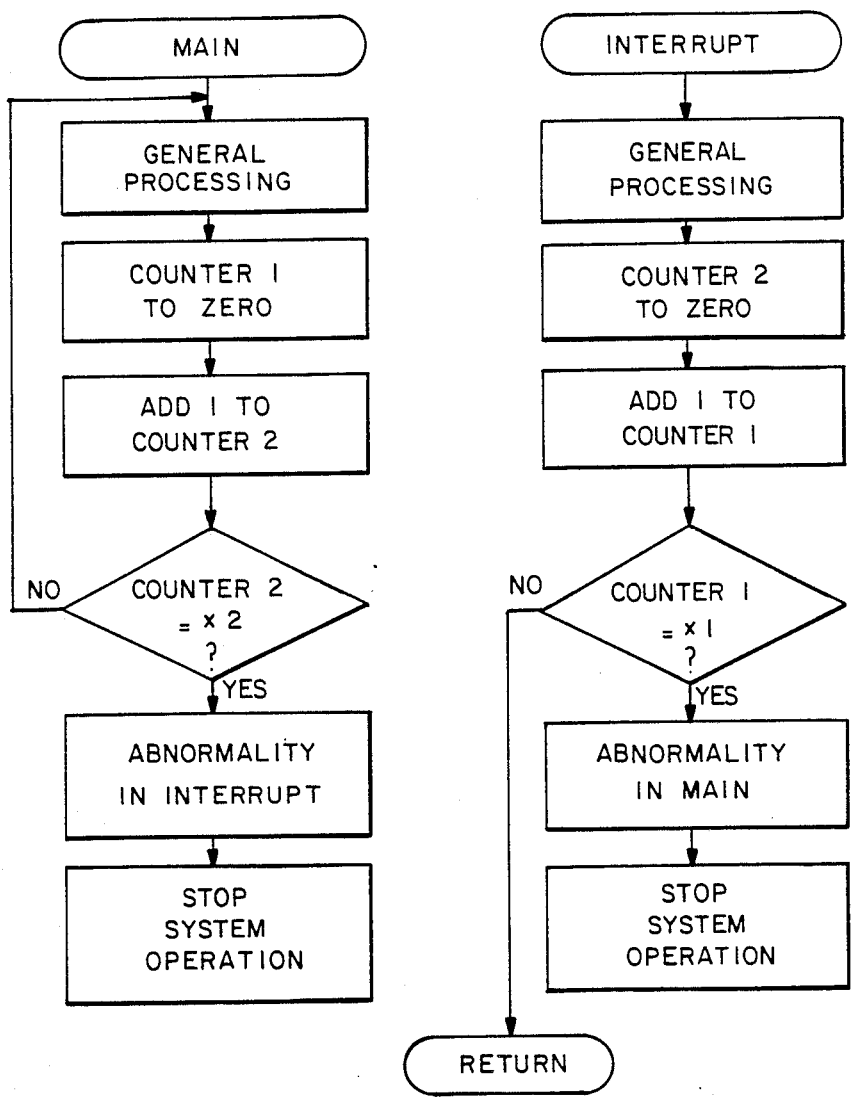
FIGS. 2 and 3 are flowcharts of the operations of the main and interrupt processing units of the self-monitoring system shown in FIG. 1.

The operations of the main and interrupt processing units 4 and 5 are explained next by way of the flow charts of FIGS. 2 and 3. As shown in FIG. 2, the main processing unit 4 generally controls the overall operation of a system such as causing a motor to rotate at a uniform speed. If an interrupt signal is received, the main program which is being processed is interrupted, and interrupt processing is carried out until it is completed and then the interrupted main program is resumed. The first counter is thereafter reset and the content of the second counter is increased by 1. If the content of the second counter is then found to be equal to or greater than $X_2$, it is concluded that an abnormal situation has occurred in the interrupt processing units 5 and the system operation is stopped. An alarm signal is simultaneously outputted as shown in FIG. 1.

Similarly, after the interrupt processing is completed, the second counter is reset and the content of the first counter is increased by 1. If the content of the first counter is then found to be equal to or greater than $X_1$, it is concluded that an abnormal situation has occurred in the main processing unit 4 and the system operation is stopped. An alarm is similarly outputted as shown in FIG. 1. In FIG. 1, "Judging" indicates means for comparing the contents of the counters and the constant values $X_1$ and $X_2$.

Let us consider a situation where the main processing unit 4 repeats a process at a frequency of once every 100 ms and that the interrupt processing units 5 interrupt the operation of the main processing unit 4 at the rate of once every 50 ms. The time required for the processing of the interrupt is assumed to be much shorter than 50 ms. In other words, the number in the first counter keeps increasing twice as fast as that in the second counter. The two constant values $X_1$ and $X_2$ are so selected that their ratio $X_1/X_2$ is equal to the ratio between the cycles of operations of the two processing units (or $100/50 = 2$ in the present example). The contents of the counters are always "0" or "1" as long as the system is operating normally and the main and interrupt processing units 4 and 5 both conclude that the other is operating normally.

If an interrupt ceases to operate, for example, or one of the interrupt processing units 5 ceases to function, the second counter is not reset. If $X_1$ and $X_2$ are set to 20 and 10, for example, the content of the second counter reaches the value of $X_2 = 10$ after 100 ms $\times 10 = 1000$ ms $= 1$ second. In other words, the system abnormality is discovered and the system operation is stopped one second later. If $X_1$ and $X_2$ are made too small, however, the system may be stopped and the alarm signal may be outputted even if the deviation from the ideal operating condition is harmlessly small and well within the allowable limit. Thus, the values of $X_1$ and $X_2$ should be determined according to the system capabilities, types of anticipated abnormalities and required sensitivities regarding these abnormalities.

The foregoing description of a preferred embodiment of the invention has been presented for purposes of illustration and description. It is not intended to be exhaustive or to limit the invention to the precise form disclosed and many modifications and variations are possible in light of the above teaching. For example, the main and interrupt processing units 4 and 5 may be adapted to subtract 1 from the contents of the first and second counters, respectively, instead of adding 1 thereto. Instead of setting at 0 in these counters to reset them, the selected values $X_1$ and $X_2$ may be set in them for the purpose of initialization and the system operation may be stopped and the alarm signal outputted when it is detected that the content of either of the counters is found to be 0. Any modifications and variations that may be apparent to a person skilled in the art are intended to be included within the scope of this invention.

What is claimed is:

1. A self-monitoring computer-controlled system comprising
    a main processing part which controls overall operations of said system by normally repeating a process at a regular frequency,
    an interrupt processing part including an interrupt processing unit which is activated by an interrupt signal, and
    an alarm,
    said main processing part further including a main counter for counting the processing time by said main processing part,
    said interrupt processing unit including an interrupt counter for counting the processing time by said interrupt processing unit,
    said main processing part normally serving to reset said interrupt counter and update the content of said main counter,
    said interrupt processing unit normally serving to reset said main counter and update the content of said interrupt counter,
    said alarm being activated if the content of said main counter exceeds a preset first number or if the content of said interrupt counter exceeds a preset second number.

2. The system of claim 1 wherein said main counter is normally reset regularly at a first frequency and said interrupt counter is normally reset regularly at a second frequency.

3. The system of claim 2 wherein said main processing unit further includes first judging means for comparing said first preset number with the content of said main counter and said interrupt processing unit further includes second judging means for comparing said second preset number with the content of said interrupt counter.

4. The system of claim 2 wherein the ratio of said first preset number to said second preset number is approximately equal to the ratio of said first frequency to said second frequency.

5. The system of claim 1 wherein said alarm, when activated, serves to stop the operation of said system.

* * * * *